United States Patent
Tsao et al.

(10) Patent No.: US 11,442,346 B2
(45) Date of Patent: Sep. 13, 2022

(54) ILLUMINATION DEVICE, PROJECTION SYSTEM AND OPERATION METHODS THEREOF

(71) Applicant: Coretronic Corporation, Hsin-Chu (TW)

(72) Inventors: Yu-Sheng Tsao, Hsin-Chu (TW); Yi-Shun Chang, Hsin-Chu (TW); Chan-Chih Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/105,525

(22) Filed: Nov. 26, 2020

(65) Prior Publication Data

US 2021/0165310 A1    Jun. 3, 2021

(30) Foreign Application Priority Data

Nov. 28, 2019  (CN) .......................... 201911188025.8

(51) Int. Cl.
  *G03B 21/16*    (2006.01)
  *G02B 26/00*    (2006.01)
  *G03B 21/20*    (2006.01)

(52) U.S. Cl.
  CPC .......... *G03B 21/16* (2013.01); *G02B 26/008* (2013.01); *G03B 21/204* (2013.01); *G03B 21/2053* (2013.01)

(58) Field of Classification Search
  CPC .. G03B 21/16; G03B 21/2013; G03B 21/204; G03B 21/2033; G03B 21/2053; G02B 26/008
  See application file for complete search history.

(56) References Cited

U.S. PATENT DOCUMENTS 11,112,688 B2 *   9/2021   Hoshino ............ G03B 21/2013
11,221,551 B2 *   1/2022   Hamamura .......... G03B 21/204
(Continued)

FOREIGN PATENT DOCUMENTS

CN    101673033    3/2010
CN    209149049    7/2019
(Continued)

OTHER PUBLICATIONS

"Office Action of China Counterpart Application", dated Oct. 29, 2021, p. 1-p. 12.

*Primary Examiner* — Magda Cruz
(74) *Attorney, Agent, or Firm* — JCIPRNET (57) ABSTRACT

An illumination device, a projection system and operation methods thereof are provided. The illumination device includes a controller, a light source device, a phosphor wheel, a cooling device, and a temperature sensor. The light source device is configured to generate an illumination beam according to a light source control signal. The phosphor wheel is configured to convert the illumination beam into a conversion beam, adjust a rotation speed of the phosphor wheel according to a phosphor wheel control signal, and generate a rotation speed status signal. The temperature sensor is configured to sense a temperature value of the phosphor wheel to generate a temperature status signal. The cooling device is configured to adjust a cooling capacity according to a cooling control signal. The controller generates the cooling control signal according to the temperature status signal, the rotation speed status signal, and the light source control signal.

17 Claims, 6 Drawing Sheets

(56) References Cited

U.S. PATENT DOCUMENTS

| | | | |
|---|---|---|---|
| 2010/0238412 A1* | 9/2010 | Kurosaki | H04N 9/3161 |
| | | | 353/31 |
| 2015/0109584 A1* | 4/2015 | Murai | H04N 9/3161 |
| | | | 353/31 |
| 2015/0181181 A1 | 6/2015 | Fukano | |
| 2016/0026075 A1* | 1/2016 | Lin | G02B 26/008 |
| | | | 353/58 |
| 2017/0104970 A1* | 4/2017 | Li | G03B 21/16 |
| 2018/0135816 A1* | 5/2018 | Ishige | G02B 5/3025 |
| 2020/0068180 A1* | 2/2020 | Kurata | H04N 9/3144 |
| 2020/0218058 A1* | 7/2020 | Takahashi | H04N 9/3182 |

FOREIGN PATENT DOCUMENTS

| | | |
|---|---|---|
| JP | 2012068528 | 4/2012 |
| JP | 2015036708 | 2/2015 |
| TW | 201040459 | 11/2010 |
| TW | 201221859 | 6/2012 |
| TW | 201709256 | 3/2017 |
| WO | 2019109451 | 6/2019 |

\* cited by examiner

|                                      | Reference temperature value (°C) |     |     |     |     |
| :----------------------------------: | :-: | :-: | :-: | :-: | :-: |
| Rotation speed of phosphor wheel (RPM) | Current value of light source current (A) | | | | |
|                                      | 1.5 | 1.8 | 2.2 | 2.6 | 3   |
| 6000                                 | 102 | 92  | 88  | 81  | 59  |
| 6600                                 | 117 | 96  | 91  | 83  | 61  |
| 7200                                 | 132 | 103 | 95  | 86  | 63  |
| 7800                                 | 148 | 113 | 102 | 89  | 66  |
| 8400                                 | 165 | 123 | 109 | 93  | 73  |
| 9000                                 | 181 | 134 | 116 | 97  | 73  |
| 9600                                 | 199 | 147 | 126 | 101 | 78  |

ILLUMINATION DEVICE, PROJECTION SYSTEM AND OPERATION METHODS THEREOF

CROSS-REFERENCE TO RELATED APPLICATION

This application claims the priority benefit of China application serial no. 201911188025.8, filed on Nov. 28, 2019. The entirety of the above-mentioned patent application is hereby incorporated by reference herein and made a part of this specification.

BACKGROUND

Technical Field

The disclosure relates to an optical device, and more particularly, to an illumination device, a projection system and operation methods thereof.

Description of Related Art

In a known projection system, a projector may excite a phosphor in a phosphor wheel by an illumination beam (e.g., laser light) emitted by a light source, and the phosphor is excited to provide conversion beams of different colors. However, a temperature status of the phosphor usually directly affects the excitation efficiency of the phosphor. For example, when the laser light continues to irradiate on the phosphor on the phosphor wheel and a rotation speed of the phosphor wheel is too slow, the phosphor will generate a large amount of thermal energy, which will cause a phenomenon that intensity of the conversion beam generated by the phosphor is significantly reduced as temperature increases. In this case, the excitation efficiency (or light emitting intensity) of the conversion beam provided by the phosphor will also be reduced, thus affecting a projection effect of the projector.

In view of this, how to perform temperature decreasing on the phosphor wheel in advance to prevent the phosphor wheel from overheating to maintain the excitation efficiency of the phosphor before the phosphor wheel has overheated will be an issue for those skilled in the art.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides an illumination device, a projection system and operation methods thereof. When it is detected that a temperature value of a phosphor wheel reaches a reference temperature value, temperature decreasing can be performed on the phosphor wheel during heating in advance to prevent the phosphor wheel from overheating to maintain luminous efficiency of the illumination device and the projection system.

Other objectives and advantages of the invention may be further understood from technical features disclosed in the invention.

In order to achieve one, some, or all of the aforementioned objectives or other objectives, an embodiment of the invention provides an illumination device. The illumination device includes a controller, a light source device, a phosphor wheel, a cooling device, and a temperature sensor. The light source device is coupled to the controller and configured to generate an illumination beam according to a light source control signal. The phosphor wheel is coupled to the controller and configured to convert the illumination beam into a conversion beam, and the phosphor wheel adjusts a rotation speed of the phosphor wheel according to a phosphor wheel control signal and generates a rotation speed status signal. The temperature sensor is coupled to the controller and configured to sense a temperature value of the phosphor wheel to generate a temperature status signal. The cooling device is coupled to the controller and configured to adjust a cooling capacity according to a cooling control signal. The controller is configured to generate the phosphor wheel control signal and the light source control signal according to an operation mode signal, and the controller generates the cooling control signal according to the temperature status signal, the rotation speed status signal, and the light source control signal.

In order to achieve one, some, or all of the aforementioned objectives or other objectives, an embodiment of the invention provides a projection system. The projection system includes an illumination device, a light valve and a projection lens. The illumination device includes a controller, a light source device, a phosphor wheel, a cooling device, and a temperature sensor. The light source device is coupled to the controller and configured to generate an illumination beam according to a light source control signal, and the phosphor wheel is coupled to the controller and configured to convert the illumination beam into a conversion beam. The phosphor wheel adjusts a rotation speed of the phosphor wheel according to a phosphor wheel control signal and generates a rotation speed status signal. The temperature sensor is coupled to the controller and configured to sense a temperature value of the phosphor wheel to generate a temperature status signal. The cooling device is coupled to the controller and configured to adjust a cooling capacity according to a cooling control signal. The controller is configured to generate the phosphor wheel control signal and the light source control signal according to an operation mode signal. The controller generates the cooling control signal according to the temperature status signal, the rotation speed status signal, and the light source control signal. The light valve is disposed on a transmission path of the illumination beam and configured to convert the illumination beam into an image beam. The projection lens is disposed on a transmission path of the image beam and configured to project the image beam.

In order to achieve one, some, or all of the aforementioned objectives or other objectives, an embodiment of the invention provides an operation method of an illumination device. The operation method includes: generating, by a controller, a phosphor wheel control signal and a light source control signal according to an operation mode signal; generating, by a light source device, an illumination beam according to the light source control signal; converting, by a phosphor wheel, the illumination beam into a conversion beam, adjusting, by the phosphor wheel, a rotation speed of the phosphor wheel according to the phosphor wheel control signal, and generating a rotation speed status signal; sensing, by a temperature sensor, a temperature value of the phosphor wheel to generate a temperature status signal; generating, by the controller, a cooling control signal according to the temperature status signal, the rotation speed status signal, and the light source control signal; and adjusting, by a cooling device, a cooling capacity according to the cooling control signal.

In order to achieve one, some, or all of the aforementioned objectives or other objectives, an embodiment of the invention provides an operation method of a projection system. The operation method includes: generating, by a controller, a phosphor wheel control signal and a light source control signal according to an operation mode signal; generating, by a light source device, an illumination beam according to the light source control signal; converting, by a phosphor wheel, the illumination beam into a conversion beam, adjusting, by the phosphor wheel, a rotation speed of the phosphor wheel according to the phosphor wheel control signal, and generating a rotation speed status signal; sensing, by a temperature sensor, a temperature value of the phosphor wheel to generate a temperature status signal; generating, by the controller, a cooling control signal according to the temperature status signal, the rotation speed status signal, and the light source control signal; adjusting, by a cooling device, a cooling capacity according to the cooling control signal; converting, by a light valve, the illumination beam into an image beam; and projecting, by a projection lens, the image beam.

Based on the foregoing, the embodiments of the invention have at least one of the following advantages or effects. The illumination device of the invention may obtain the reference temperature value corresponding to the phosphor wheel through the controller according to a current value of a light source current and the rotation speed of the phosphor wheel by calculation or lookup. Moreover, by comparing an actual temperature value of the phosphor wheel with the reference temperature value, it is determined whether a temperature status of the phosphor wheel exceeds a current reference temperature value of a temperature decreasing mechanism. In this way, timing of starting temperature decreasing may be dynamically adjusted according to the current value of the light source current and the rotation speed of the phosphor wheel, so as to avoid a phenomenon that the phosphor wheel cannot be maintained in a thermally stable status due to overheating of a phosphor since the temperature decreasing mechanism is started too late or it takes a relatively long time for the temperature value of the phosphor wheel to be maintained in a thermally stable status since the temperature decreasing mechanism is started too early, thereby maintaining excitation efficiency of the phosphor.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
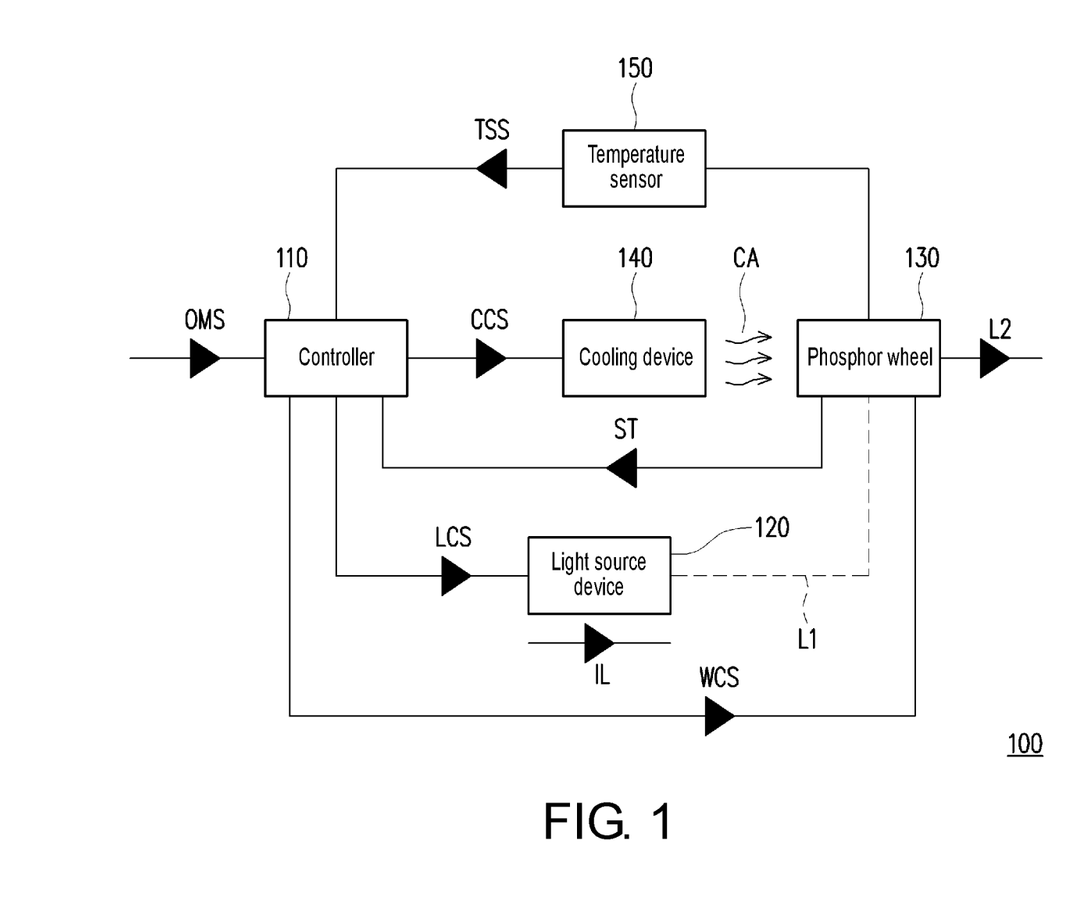
FIG. 1 is a schematic diagram illustrating an illumination device according to an embodiment of the invention.

FIG. 1 is a schematic diagram of an illumination device 100 according to an embodiment of the invention. Referring to FIG. 1, in the present embodiment, the illumination device 100 includes a controller 110, a light source device 120, a phosphor wheel 130, a cooling device 140, and a temperature sensor 150. The controller 110 may receive an operation mode signal OMS and determine an operation status of the illumination device 100 according to the operation mode signal OMS. For example, the controller 110 may determine that the illumination device 100 operates in a plurality of different display modes (e.g., a briefing display mode, a medical display mode, a high-quality display mode, a three-dimensional display mode, etc.) according to the operation mode signal OMS provided or set by a user. However, the number and type names thereof do not limit the invention. Moreover, in different display modes, the controller 110 may generate and set a phosphor wheel control signal WCS and a light source control signal LCS according to the operation mode signal OMS.

The light source device 120 is coupled to the controller 110 to receive the light source control signal LCS. The light source device 120 may set a current value magnitude of a light source current IL according to the light source control signal LCS, and the light source device 120 may generate an illumination beam L1 according to the light source current IL. The light source control signal LCS may be associated with the light source current IL that drives the light source device 120. Moreover, the illumination beam L1 in the present embodiment may be, for example, a blue laser beam.

On the other hand, the phosphor wheel 130 is coupled to the controller 110 to receive the phosphor wheel control signal WCS. The illumination device 100 may drive the phosphor wheel 130 through the phosphor wheel control signal WCS, so that the phosphor wheel 130 may rotate according to the phosphor wheel control signal WCS and adjust and set a rotation speed of the phosphor wheel 130. Besides, the phosphor wheel 130 may also obtain a rotation speed status signal ST according to the rotation speed of the phosphor wheel 130 and return the rotation speed status signal ST to the controller 110. The rotation speed status signal ST in the present embodiment may be associated with the rotation speed of the phosphor wheel 130.

In addition, in the present embodiment, the rotation speed of the phosphor wheel 130 and the light source current IL of the light source device 120 are associated with the operation mode signal OMS. In other words, the controller 110 may set or adjust the rotation speed of the phosphor wheel 130 and the current value of the light source current IL according to the display mode selected by the user.

It is worth mentioning that the phosphor wheel 130 in the present embodiment may have a phosphor. The light source device 120 may excite the phosphor on the phosphor wheel 130 through the illumination beam L1, so that the phosphor wheel 130 may convert the illumination beam L1 into conversion beams L2 of different colors (e.g., green or yellow).

On the other hand, the temperature sensor 150 is coupled between the phosphor wheel 130 and the controller 110. In other embodiments, the temperature sensor 150 may not be directly connected to the controller 110. The temperature sensor 150 may be configured to sense a temperature value of the phosphor wheel 130 and generate a temperature status signal TSS to the controller 110 according to a temperature status of the phosphor wheel 130. The temperature status signal TSS in the present embodiment may be associated with the temperature value TV of the phosphor wheel 130. In this case, the controller 110 may generate a cooling control signal CCS according to the temperature status signal TSS, the rotation speed status signal ST, and the light source control signal LCS.

The cooling device 140 is coupled to the controller 110 to receive the cooling control signal CCS. In the present embodiment, the controller 110 may adjust a cooling capacity of the cooling device 140 through the cooling control signal CCS. Moreover, the cooling device 140 may generate cold air CA according to the cooling control signal CCS, and perform temperature decreasing operation on the phosphor wheel 130 through the cold air CA.

In particular, the controller 110 in the present embodiment may be, for example, a central processing unit (CPU), or other programmable general-purpose or special-purpose microprocessors, digital signal processors (DSP), programmable controllers, application specific integrated circuits (ASIC), programmable logic devices (PLD), or other similar devices or a combination of these devices, which may load and execute computer programs. The invention is not limited thereto. In addition, the cooling device 140 in the present embodiment may include at least one of a fan, a thermoelectric cooler (TEC), and a water cooling device.

Regarding operation details of the illumination device 100 shown in FIG. 1, in detail, in the present embodiment, the controller 110 may set the current value of the light source current IL that drives the light source device 120 through the light source control signal LCS according to the display mode indicated by the operation mode signal OMS. Moreover, the controller 110 may also drive the phosphor wheel 130 and set the rotation speed of the phosphor wheel 130 through the phosphor wheel control signal WCS according to the display mode indicated by the operation mode signal OMS.

Then, the phosphor wheel 130 may provide the rotation speed status signal ST to the controller 110 according to the phosphor wheel control signal WCS, so that the controller 110 may obtain a rotation speed status of the phosphor wheel 130 according to the rotation speed status signal ST. After the controller 110 completes the setting of the current value of the light source current IL and obtains the rotation speed status of the phosphor wheel 130, the controller 110 may calculate, according to the light source control signal LCS and the rotation speed status signal ST, a reference temperature value TREF starting a temperature decreasing mechanism of the illumination device 100 under an operation status of the current value of the current light source current IL and the current rotation speed of the phosphor wheel 130. In other words, the reference temperature value TREF in the present embodiment may generally refer to a reference temperature value for starting the temperature decreasing mechanism of the illumination device 100 under the operation status of the current value of the current light source current IL and the current rotation speed of the phosphor wheel 130.

Then, in the process of converting the illumination beam L1 into the conversion beam L2 by the phosphor wheel 130, the illumination device 100 may sense the temperature status of the phosphor wheel 130 through the temperature sensor 150 to obtain an actual temperature value TV, and provide the temperature status signal TSS associated with the temperature value TV to the controller 110. In this case, the controller 110 may generate the cooling control signal CSS by comparing the temperature value TV of the phosphor wheel 130 with the reference temperature value TREF.

Further, the controller 110 in the present embodiment may determine whether the temperature status of the phosphor wheel 130 is in an overheating status by determining whether a temperature difference between the temperature value TV of the phosphor wheel 130 and the reference temperature value TREF is within a certain preset temperature range, and then generate the cooling control signal CSS to the cooling device 140 according to a determination result.

For example, when the controller 110 determines that the temperature difference between the temperature value TV of the phosphor wheel 130 and the reference temperature value TREF exceeds the preset temperature range and the temperature value TV of the phosphor wheel 130 is greater than the reference temperature value TREF, it means that the temperature status of the phosphor wheel 130 has exceeded a current reference temperature value of the temperature decreasing mechanism. In this case, the cooling device 140 may increase the cooling capacity (e.g., increase strength of the cold air CA) according to the cooling control signal CSS, so that the phosphor wheel 130 can be reduced in temperature according to the cold air CA having a relatively high cooling capacity, thereby improving a thermally stable status of the phosphor wheel 130 to avoid overheating of the phosphor wheel. In contrast, when the controller 110 determines that the temperature difference between the temperature value TV of the phosphor wheel 130 and the reference temperature value TREF exceeds the preset temperature range and the temperature value TV is not greater than the reference temperature value TREF, it means that the temperature status of the phosphor wheel 130 does not exceed the current reference temperature value of the temperature decreasing mechanism. In this case, the cooling device 140 may reduce or maintain the cooling capacity (e.g., reduce or maintain the strength of the cold air CA) according to the cooling control signal CSS, so as to avoid a phenomenon that it takes a relatively long time for the temperature value of the phosphor wheel 130 to be maintained in a thermally stable status.

It should be noted that the preset temperature range in the present embodiment may be, for example, ±5% of the reference temperature value TREF, but the invention is not limited thereto. The preset temperature range of the invention may be adjusted according to design requirements of the illumination device 100.

In other words, in the illumination device 100 shown in FIG. 1, the controller 110 may calculate the reference temperature value TREF corresponding to the phosphor wheel 130 according to the current value of the light source current IL and the rotation speed of the phosphor wheel 130. Moreover, by comparing the actual temperature value TV of the phosphor wheel 130 with the reference temperature value TREF, it is determined whether the temperature status of the phosphor wheel 130 exceeds the current reference temperature value of the temperature decreasing mechanism. In this way, before the phosphor wheel 130 overheats, the cooling device 140 may increase the cooling capacity according to the cooling control signal CSS, and reduce the temperature of the phosphor wheel 130 during heating in advance to prevent the temperature from rising too fast, thereby maintaining excitation efficiency of the phosphor.

Figure 2:
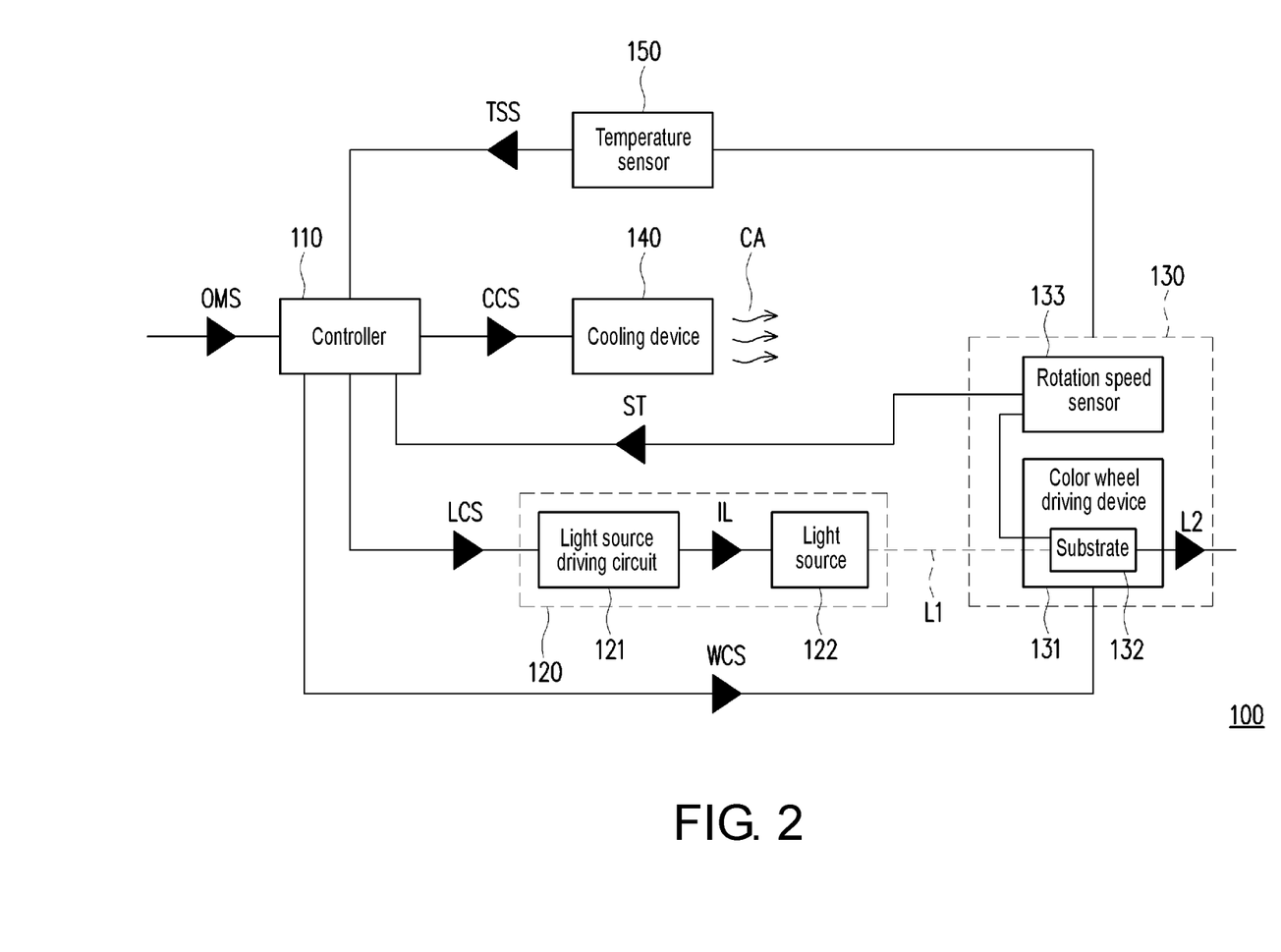
FIG. 2 is a schematic diagram of a light source device and a phosphor wheel according to the embodiment of the invention in FIG. 1.

FIG. 2 is a schematic diagram of a light source device 120 and a phosphor wheel 130 according to the embodiment of the invention in FIG. 1. Referring to FIG. 2, the light source device 120 may include a light source driving circuit 121 and a light source 122. The light source driving circuit 121 is coupled to the controller 110. The light source 122 is coupled to the light source driving circuit 121. The light source 122 in the present embodiment may be, for example, a laser diode (LD), a light emitting diode (LED), or an array or a group formed by one of the LD and the LED, and the invention is not limited thereto. In the present embodiment, the light source 122 may be a laser light emitting element including an LD. For example, the light source 122 may be a blue laser diode bank, and the illumination beam L1 is a blue laser beam, but the invention is not limited thereto.

In particular, in the present embodiment, the light source 122 generally refers to a light source capable of emitting a short-wavelength beam. A peak wavelength of the short-wavelength beam falls, for example, within a wavelength range of blue light or a wavelength range of ultraviolet light. The peak wavelength is defined as a wavelength corresponding to a maximum light intensity.

On the other hand, the phosphor wheel 130 may include a color wheel driving device 131, a substrate 132 and a rotation speed sensor 133. The color wheel driving device 131 is coupled to the controller 110. The substrate 132 may be disposed in the color wheel driving device 131, and the substrate 132 may have a phosphor. In the present embodiment, the color wheel driving device 131 may drive the substrate 132 to rotate according to the phosphor wheel control signal WCS. In addition, the rotation speed sensor 133 is coupled between the substrate 132 and the controller 110. The rotation speed sensor 133 may be configured to sense the rotation speed of the phosphor wheel 130 to generate the rotation speed status signal ST to the controller 110. Specifically, the rotation speed sensor 133 may be configured to sense a rotation speed of the substrate 132 in the phosphor wheel 130 and provide the rotation speed status signal ST to the controller 110 according to the rotation speed of the substrate 132.

Figure 3:
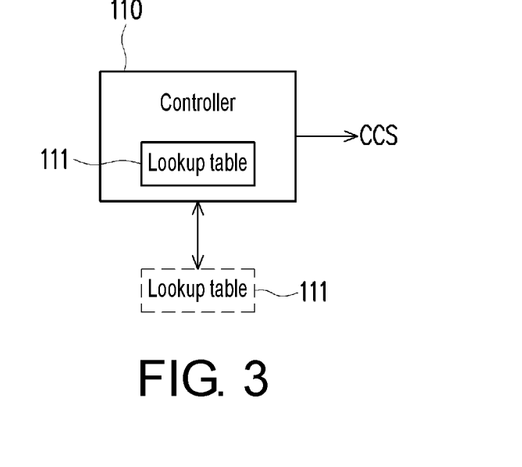
FIG. 3 is a schematic diagram illustrating a lookup table according to an embodiment of the invention.

Referring to FIG. 2 and FIG. 3 at the same time, FIG. 3 is a schematic diagram illustrating a lookup table 111 according to an embodiment of the invention. In the present embodiment, the lookup table 111 may be built in the controller 110, or under other design requirements, the lookup table 111 may be externally connected to the controller 110 and coupled to the controller 110. The lookup table 111 in the present embodiment may be configured to record a relationship among the rotation speed of the phosphor wheel 130, the current value of the light source current IL and the reference temperature value TREF of the phosphor wheel 130.

Figure 4:
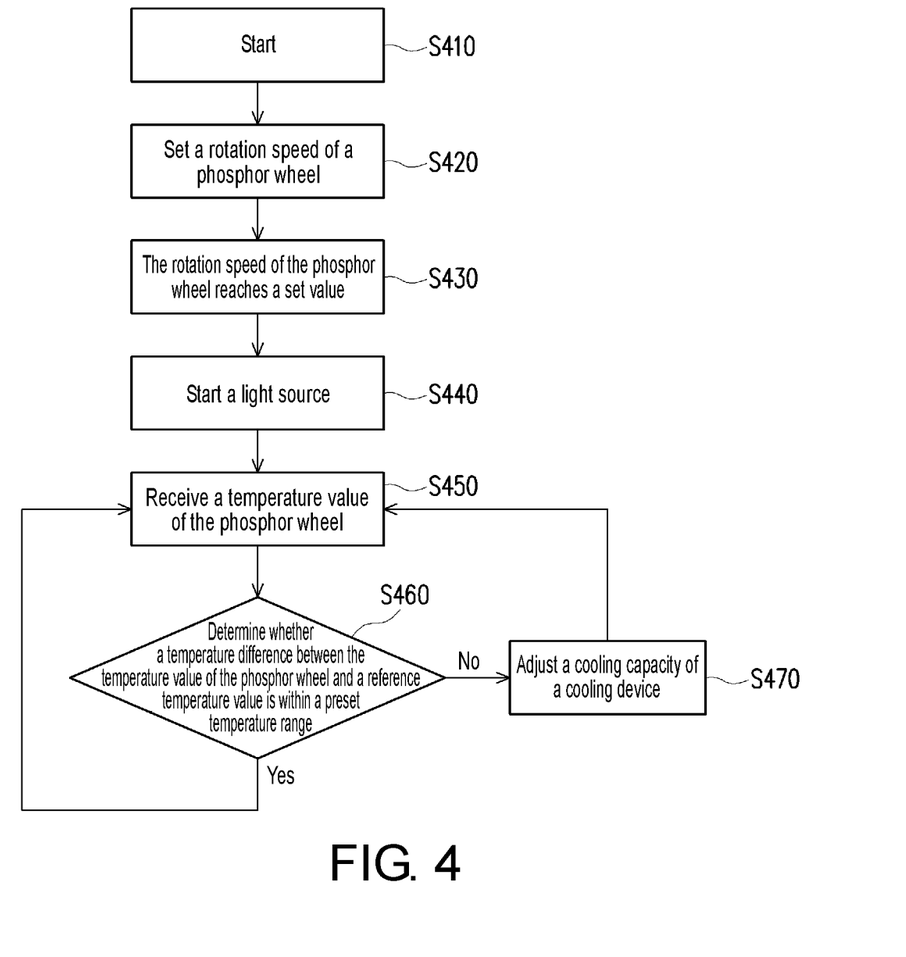
FIG. 4 is an operation flowchart illustrating a controller according to an embodiment of the invention.

For operation details of the illumination device 100 shown in FIG. 2, reference is made to FIG. 2, FIG. 3 and FIG. 4 at the same time. FIG. 4 is an operation flowchart illustrating a controller 110 according to an embodiment of the invention. In detail, in step S410, the controller 110 may start an operation of the illumination device 100. Then, in step S420, the controller 110 may set the rotation speed of the phosphor wheel 130. Further, in step S420, the controller 110 may generate and set the phosphor wheel control signal WCS according to the operation mode signal OMS, and the color wheel driving device 131 may drive the substrate 132 through the phosphor wheel control signal WCS, so that the substrate 132 may rotate according to the phosphor wheel control signal WCS and the rotation speed of the substrate 132 may be adjusted and set. In other words, the controller 110 in the present embodiment may adjust and set the rotation speed of the phosphor wheel 130 (or the substrate 132) according to the display mode operated by the illumination device 100.

After completing the setting of the rotation speed of the phosphor wheel 130, the phosphor wheel 130 may generate the rotation speed status signal ST to the controller 110 according to the rotation speed, and in step S430, the controller 110 may determine that the rotation speed of the phosphor wheel 130 has reached a set value required for the display mode according to the rotation speed status signal ST.

Then, the controller 110 may generate and set the light source control signal LCS according to the operation mode signal OMS, and the light source driving circuit 121 may generate the light source current IL according to the light source control signal LCS. Accordingly, in step S440, the light source driving circuit 121 may start the light source 122 through the light source current IL. In addition, the light source 122 may generate the illumination beam L1 through the light source current IL, and excite the phosphor in the substrate 132 through the illumination beam L1, so that the substrate 132 may convert the illumination beam L1 into conversion beams L2 of different colors (e.g., green or yellow).

Then, in the process of converting the illumination beam L1 into the conversion beam L2 by the substrate 132, the illumination device 100 may sense the temperature value of the phosphor wheel 130 through the temperature sensor 150, and provide the temperature status signal TSS to the controller 110. Accordingly, in step S450, the controller 110 may receive or obtain the temperature value TV of the phosphor wheel 130 according to the temperature status signal TSS.

It is worth mentioning that after the controller 110 obtains the temperature value TV of the phosphor wheel 130, the controller 110 in the present embodiment may search for, according to the light source control signal LCS and the rotation speed status signal ST, the corresponding reference temperature value TREF under the current light source current IL and the current rotation speed of the phosphor wheel 130 from the lookup table 111.

Figure 5:
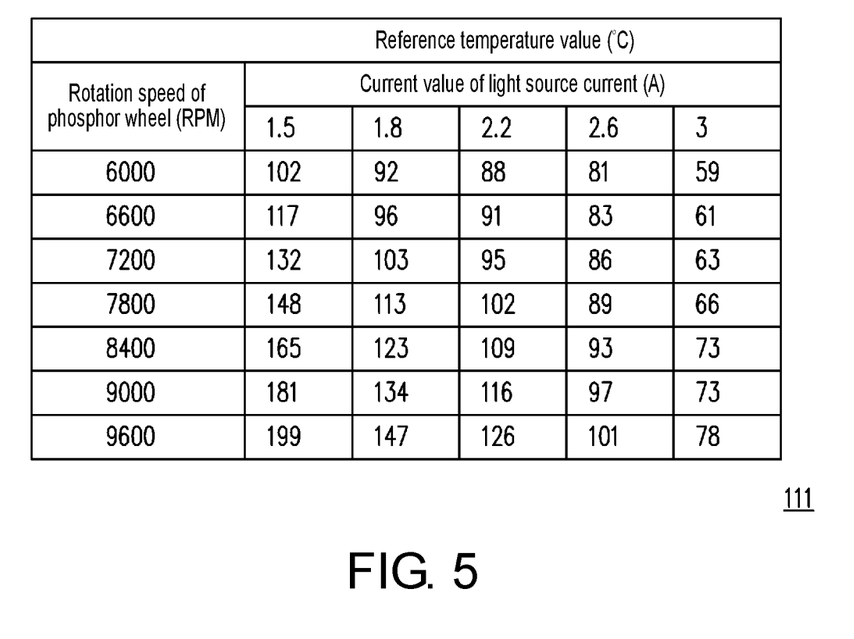
FIG. 5 is a schematic diagram of a relationship among a rotation speed of a phosphor wheel, a current value of a light source current and a reference temperature value in the lookup table shown in FIG. 3 according to the invention.

Herein, referring to FIG. 5, FIG. 5 is a schematic diagram of a relationship among a rotation speed of a phosphor wheel 130, a current value of a light source current IL and a reference temperature value TREF in the lookup table 111 shown in FIG. 3 according to the invention. In the present embodiment, the lookup table 111 may record the reference temperature value TREF (or reference temperature value) for starting the temperature decreasing mechanism of the illumination device 100 under different operation statuses of the current value of the light source current IL and the rotation speed of the phosphor wheel 130. As shown in FIG. 5, under a fixed rotation speed of the phosphor wheel 130, when the current value of the light source current IL is larger, the reference temperature value TREF (or reference temperature value) that starts the temperature decreasing mechanism of the illumination device 100 is lower. This is because energy is stronger when the current value of the light source (e.g., laser) current IL is larger, which makes the temperature value of the phosphor wheel 130 rise faster. Since it takes time for the temperature decreasing mechanism of the illumination device 100 to remove heat, the temperature decreasing mechanism is started only when the temperature value of the phosphor wheel 130 is high, and the temperature value of the phosphor wheel 130 cannot be immediately reduced to maintain a thermally stable status. Therefore, the excitation efficiency (or light emitting intensity) of providing the conversion beam by the phosphor will also be reduced. As a result, a projection effect of a projector is affected. Therefore, in order to ensure an acceptable excitation efficiency of the phosphor, when the reference temperature value TREF (or reference temperature value) is relatively low, the temperature decreasing mechanism of the illumination device 100 needs to be first started to reduce the temperature of the phosphor wheel 130. On the other hand, under the fixed rotation speed of the phosphor wheel 130, when the current value of the light source current IL is smaller, the temperature value of the phosphor wheel 130 rises slower, so there is no need to start the temperature decreasing mechanism of the illumination device 100 too early to reduce the temperature of the phosphor wheel 130, thereby avoiding a phenomenon that it takes a relatively long time for the temperature value of the phosphor wheel 130 to be maintained in a thermally stable status. Meanwhile, since the temperature decreasing mechanism for the phosphor wheel 130 in the illumination device 100 is generally fan-based, the fan may be prevented from being started too early, and the effect of noise reduction may be achieved.

Referring to FIG. 2 to FIG. 5 again at the same time, in step S460 shown in FIG. 4, the controller 110 may determine whether a temperature difference between the temperature value TV of the phosphor wheel 130 and the reference temperature value TREF is within a preset temperature range (e.g., ±5% of the reference temperature value TREF) by comparing the temperature value TV of the phosphor wheel 130 with the reference temperature value TREF.

For example, in operation of the illumination device 100, it is assumed that the controller 110 sets, according to the operation mode signal OMS, the light source current IL to operate at 1.5 amperes (A), and sets, according to the operation mode signal OMS, the phosphor wheel 130 to operate at 6,000 revolutions per minute (RPM). Moreover, it is assumed that in the process of converting the illumination beam L1 into the conversion beam L2 by the substrate 132, the temperature value TV of the phosphor wheel 130 sensed by the temperature sensor 150 is 110 degrees (° C.).

In this case, the controller 110 searches from the lookup table 111 according to the current light source control signal LCS and the current rotation speed status signal ST and finds that the corresponding reference temperature value is TREF 102° C. under the current value of the light source current IL being 1.5 A and the rotation speed of the phosphor wheel 130 being 6,000 RPM. In the above situation, since the controller 110 determines that the temperature difference (that is, difference of 8° C.) between the temperature value TV of the phosphor wheel 130 and the reference temperature value TREF has exceeded the preset temperature range (i.e., plus or minus 5.1° C.) and the temperature value TV (i.e., 110° C.) is greater than the reference temperature value TREF (that is, 102° C.), it means that the temperature status of the phosphor wheel 130 has exceeded the current reference temperature value of the temperature decreasing mechanism. Therefore, the controller 110 performs an operation in step S470 to adjust the cooling capacity of the cooling device 140.

Further, in step S470, the cooling device 140 may increase the cooling capacity according to the cooling control signal CSS (e.g., increase the strength of the cold air CA), so that the phosphor wheel 130 can reduce the temperature according to the cold air CA having a relatively high cooling capacity, thereby improving the thermally stable status of the phosphor wheel 130. In addition, after the controller 110 completes the operation in step S470, the controller 110 performs the operation in step S450 again.

In contrast, under the same assumptions, when the temperature value TV of the phosphor wheel 130 sensed by the temperature sensor 150 is 90° C., since the controller 110 determines that the temperature difference (that is, difference of 12° C.) between the temperature value TV of the phosphor wheel 130 and the reference temperature value TREF has exceeded the preset temperature range (i.e., plus or minus 5.1° C.) and the temperature value TV (i.e., 90° C.) is not greater than the reference temperature value TREF (that is, 102° C.), it means that in the temperature status of the phosphor wheel 130, it is not necessary to start the temperature decreasing mechanism of the illumination device 100 to reduce the temperature of the phosphor wheel 130. In this case, the controller 110 also performs an operation in step S470 to adjust the cooling capacity of the cooling device 140.

Further, in step S470, when the controller 110 determines that the temperature status of the phosphor wheel 130 is not in an overheating status and the temperature difference between the temperature value TV and the reference temperature value TREF has exceeded the preset temperature range, the cooling device 140 may reduce or maintain the cooling capacity according to the cooling control signal CSS (e.g., reduce or maintain the strength of the cold air CA), so as to avoid a phenomenon that it takes a relatively long time for the temperature value of the phosphor wheel 130 to be maintained in a thermally stable status.

In some cases, when the controller 110 determines that the temperature difference between the temperature value TV and the reference temperature value TREF is within the preset temperature range and regardless of whether the temperature value TV is greater than the reference temperature value TREF, it means that in the temperature status of the phosphor wheel 130, it is not necessary to start the temperature decreasing mechanism of the illumination device 100 to reduce the temperature of the phosphor wheel 130. In this case, the cooling device 140 may maintain the current cooling capacity to continuously perform cooling on the phosphor wheel 130. Moreover, after the controller 110 completes an operation in step S460, the controller 110 may perform the operation in step S450 again.

Figure 6:
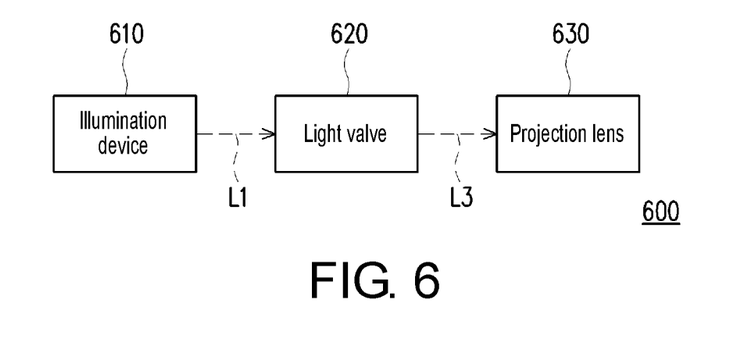
FIG. 6 is a schematic diagram illustrating a projection system according to an embodiment of the invention.

FIG. 6 is a schematic diagram illustrating a projection system 600 according to an embodiment of the invention. Referring to FIG. 6, in the present embodiment, the projection system 600 includes an illumination device 610, a light valve 620 and a projection lens 630. The illumination device 610 in the present embodiment may be deduced by referring to related descriptions of the illumination device 100 mentioned in FIG. 1 and FIG. 2. Therefore, the descriptions thereof are omitted herein.

Herein, reference is made to FIG. 1, FIG. 2 and FIG. 6 at the same time. In the present embodiment, the light valve 620 is coupled to the controller 110 of the illumination device 100 and disposed on a transmission path of an illumination beam L1 to convert the illumination beam L1 into an image beam L3. The projection lens 630 is disposed on a transmission path of the image beam L3 and configured to project the image beam L3 onto a screen or a wall (not shown) to form an image picture.

After illumination beams L1 of different colors are irradiated onto the light valve 620, the light valve 620 converts the illumination beams L1 of different colors into the image beams L3 in a time sequence and transmits the image beams to the projection lens 630. Therefore, after the image beams L3 converted by the light valve 620 are projected, the image picture of the projection system 600 can be a color picture.

In the present embodiment, the light valve 620 is, for example, a digital micro-mirror device (DMD) or a liquid-crystal-on-silicon (LCOS) panel. However, in other embodiments, the light valve 620 may be a transmissive liquid crystal panel or other spatial light modulators. In addition, the number of light valves 620 is not limited in the present embodiment. In the present embodiment, the projection lens 630 is, for example, a combination including one or more optical lenses having diopters. The optical lenses include, for example, a non-planar lens such as a biconcave lens, a biconvex lens, a concave-convex lens, a convex-concave lens, a plano-convex lens, or a plano-concave lens, or various combinations thereof. The invention does not limit the type and category of the projection lens 630.

Figure 7:
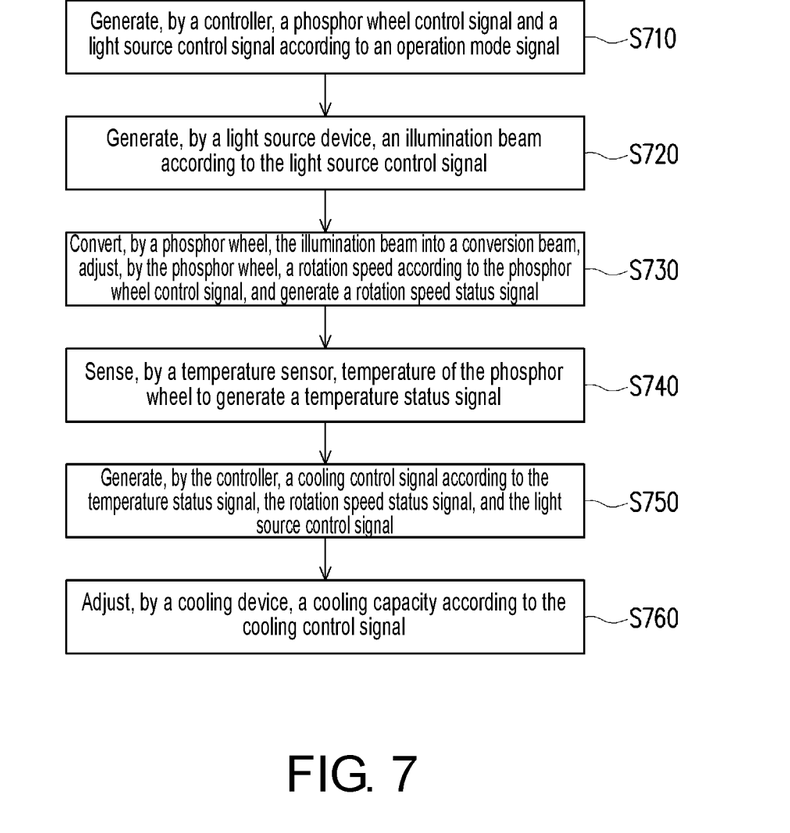
FIG. 7 is a flowchart of an operation method of the illumination device according to the embodiment of the invention in FIG. 1.

FIG. 7 is a flowchart of an operation method of the illumination device 100 according to the embodiment of the invention in FIG. 1. Referring to FIG. 1 and FIG. 2 at the same time, in step S710, the illumination device 100 may generate the phosphor wheel control signal WCS and the light source control signal LCS by the controller 110 according to the operation mode signal OMS. In step S720, the illumination device 100 may generate the illumination beam L1 by the light source device 120 according to the light source control signal LCS. In step S730, the illumination device 100 may convert the illumination beam L1 into the conversion beam L2 by the phosphor wheel 130, and adjust the rotation speed by the phosphor wheel 130 according to the phosphor wheel control signal WCS and generate the rotation speed status signal ST.

In step S740, the illumination device 100 may sense the temperature of the phosphor wheel 130 by the temperature sensor 150 to generate the temperature status signal TSS. In step S750, the illumination device 100 may generate the cooling control signal CCS according to the temperature status signal TSS, the rotation speed status signal ST, and the light source control signal LCS by the controller 110. In step S760, the illumination device 100 may adjust the cooling capacity according to the cooling control signal CCS by the cooling device 140.

Figure 8:
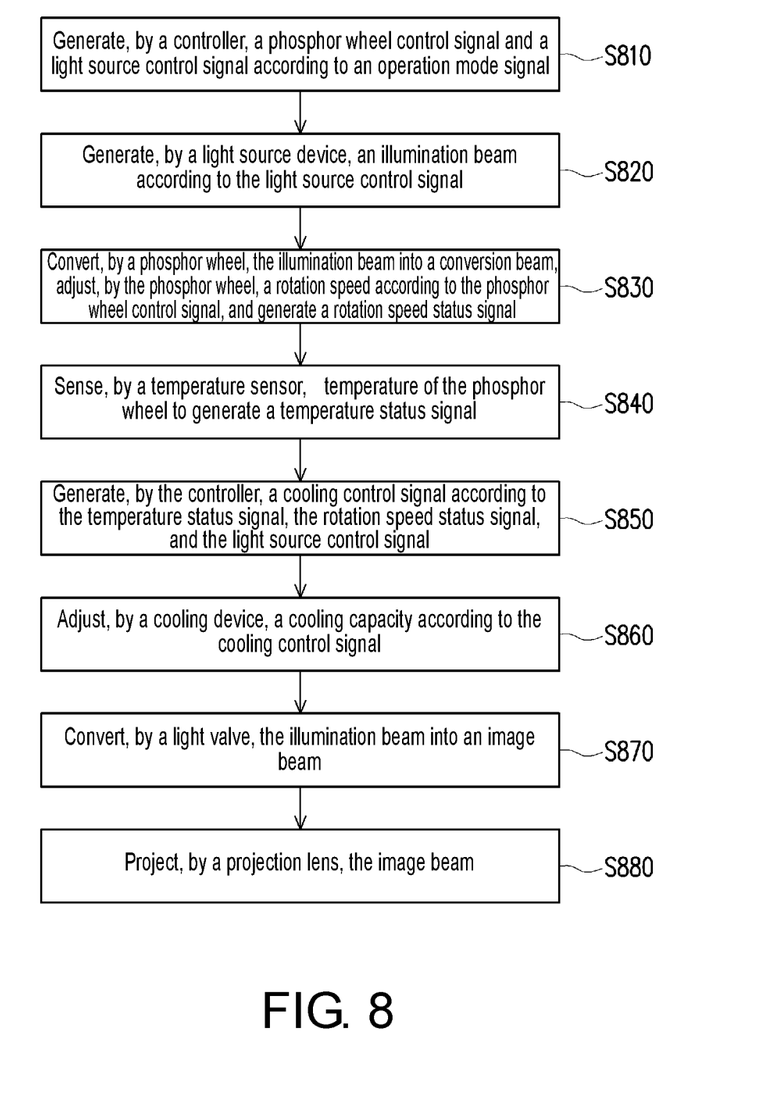
FIG. 8 is a flowchart of an operation method of the projection system according to the embodiment of the invention in FIG. 6.

FIG. 8 is a flowchart of an operation method of the projection system 600 according to the embodiment of the invention in FIG. 6. Referring to FIG. 1, FIG. 6 and FIG. 8 at the same time, in step S810, the projection system 600 may generate the phosphor wheel control signal WCS and the light source control signal LCS by the controller 110 according to the operation mode signal OMS. In step S820, the projection system 600 may generate the illumination beam L1 by the light source device 120 according to the light source control signal LCS. In step S830, the projection system 600 may convert the illumination beam L1 into the conversion beam L2 by the phosphor wheel 130, and adjust the rotation speed by the phosphor wheel 130 according to the phosphor wheel control signal WCS and generate the rotation speed status signal ST. In step S840, the projection system 600 may sense the temperature emitted by the phosphor wheel 130 by the temperature sensor 150 to generate the temperature status signal TSS.

In step S850, the projection system 600 may generate the cooling control signal CCS according to the temperature status signal TSS, the rotation speed status signal ST, and the light source control signal LCS by the controller 110. In step S860, the projection system 600 may adjust the cooling capacity according to the cooling control signal CCS by the cooling device 140. In step S870, the projection system 600 may convert the illumination beam L1 into the image beam L3 by the light valve 620. In step S880, the projection system 600 may project the image beam L3 by the projection lens 630. Implementation details of each step in FIG. 7 and FIG. 8 are described in the foregoing embodiments and implementation manners in detail, and will not be repeated herein.

Based on the foregoing, the embodiments of the invention have at least one of the following advantages or effects. The illumination device and the projection system of the invention may search for the reference temperature value of the phosphor wheel from the lookup table through the controller according to the current value of the light source current and the rotation speed of the phosphor wheel. Moreover, by comparing the actual temperature value of the phosphor wheel with the reference temperature value, it is determined whether the temperature status of the phosphor wheel exceeds the current reference temperature value of the temperature decreasing mechanism. In this way, timing of starting temperature decreasing may be dynamically adjusted according to the current value of the light source current and the rotation speed of the phosphor wheel, so as to avoid a phenomenon that the phosphor wheel cannot be maintained in a thermally stable status due to overheating of a phosphor since the temperature decreasing mechanism is started too late or it takes a relatively long time for the temperature value of the phosphor wheel to be maintained in a thermally stable status since the temperature decreasing mechanism is started too early, thereby maintaining the excitation efficiency of the phosphor.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination device, comprising a controller, a light source device, a phosphor wheel, a cooling device, and a temperature sensor, wherein
    the light source device is coupled to the controller and configured to generate an illumination beam according to a light source control signal,
    the phosphor wheel is coupled to the controller and configured to convert the illumination beam into a conversion beam, and the phosphor wheel adjusts a rotation speed of the phosphor wheel according to a phosphor wheel control signal and generates a rotation speed status signal,
    the temperature sensor is coupled to the controller and configured to sense a temperature value of the phosphor wheel to generate a temperature status signal,
    the cooling device is coupled to the controller and configured to adjust a cooling capacity according to a cooling control signal, and
    the controller is configured to generate the phosphor wheel control signal and the light source control signal according to an operation mode signal, and the controller generates the cooling control signal according to the temperature status signal, the rotation speed status signal, and the light source control signal,
    wherein the light source control signal is associated with a light source current driving the light source device, the temperature status signal is associated with the temperature value of the phosphor wheel, and the rotation speed status signal is associated with the rotation speed of the phosphor wheel, the controller obtains a reference temperature value of the phosphor wheel according to the light source control signal and the rotation speed status signal, and compares the temperature value of the phosphor wheel with the reference temperature value to generate the cooling control signal.

2. The illumination device according to claim 1, wherein the controller comprises a lookup table, wherein the lookup table is configured to record a relationship among the rotation speed of the phosphor wheel, a current value of the light source current and the reference temperature value, and the controller generates the cooling control signal through the lookup table according to the rotation speed status signal and the light source current.

3. The illumination device according to claim 1, wherein the controller determines whether a temperature difference between the temperature value of the phosphor wheel and the reference temperature value is within a preset temperature range to generate the cooling control signal.

4. The illumination device according to claim 3, wherein the preset temperature range is ±5% of the reference temperature value.

5. The illumination device according to claim 1, wherein the light source device comprises a light source driving circuit and a light source, wherein
    the light source driving circuit is coupled to the controller and configured to generate the light source current according to the light source control signal, and
    the light source is coupled to the light source driving circuit and configured to generate the illumination beam according to the light source current.

6. The illumination device according to claim 1, wherein the phosphor wheel comprises a color wheel driving device and a substrate, wherein
    the color wheel driving device is coupled to the controller and configured to drive the substrate to rotate according to the phosphor wheel control signal, and
    the substrate is disposed on the color wheel driving device and configured to convert the illumination beam into the conversion beam.

7. The illumination device according to claim 1, wherein the phosphor wheel comprises a rotation speed sensor, the rotation speed sensor being coupled to the controller and configured to sense the rotation speed of the phosphor wheel to generate the rotation speed status signal.

8. The illumination device according to claim 1, wherein the rotation speed of the phosphor wheel and the light source current of the light source device are associated with the operation mode signal.

9. A projection system, comprising an illumination device, a light valve and a projection lens, wherein
    the illumination device comprises a controller, a light source device, a phosphor wheel, a cooling device, and a temperature sensor, wherein the light source device is coupled to the controller and configured to generate an illumination beam according to a light source control signal, the phosphor wheel is coupled to the controller and configured to convert the illumination beam into a conversion beam, the phosphor wheel adjusts a rotation speed of the phosphor wheel according to a phosphor wheel control signal and generates a rotation speed status signal, the temperature sensor is coupled to the controller and configured to sense a temperature value of the phosphor wheel to generate a temperature status signal, and the cooling device is coupled to the controller and configured to adjust a cooling capacity according to a cooling control signal, wherein the controller is configured to generate the phosphor wheel control signal and the light source control signal according to an operation mode signal, and the controller generates the cooling control signal according to the temperature status signal, the rotation speed status signal, and the light source control signal, wherein the light source control signal is associated with a light source current driving the light source device, the temperature status signal is associated with the temperature value of the phosphor wheel, and the rotation speed status signal is associated with the rotation speed of the phosphor wheel, the controller obtains a reference temperature value of the phosphor wheel according to the light source control signal and the rotation speed status signal, and compares the temperature value of the phosphor wheel with the reference temperature value to generate the cooling control signal, the light valve is disposed on a transmission path of the illumination beam and configured to convert the illumination beam into an image beam, and the projection lens is disposed on a transmission path of the image beam and configured to project the image beam.

10. An operation method of an illumination device, comprising:

generating, by a controller, a phosphor wheel control signal and a light source control signal according to an operation mode signal;

generating, by a light source device, an illumination beam according to the light source control signal;

converting, by a phosphor wheel, the illumination beam into a conversion beam, adjusting, by the phosphor wheel, a rotation speed of the phosphor wheel according to the phosphor wheel control signal, and generating a rotation speed status signal;

sensing, by a temperature sensor, a temperature value of the phosphor wheel to generate a temperature status signal;

generating, by the controller, a cooling control signal according to the temperature status signal, the rotation speed status signal, and the light source control signal;

obtaining, by the controller, a reference temperature value of the phosphor wheel according to the light source control signal and the rotation speed status signal, and comparing the temperature value of the phosphor wheel with the reference temperature value to generate the cooling control signal, wherein the light source control signal is associated with a light source current driving the light source device, the temperature status signal is associated with the temperature value of the phosphor wheel, and the rotation speed status signal is associated with the rotation speed of the phosphor wheel; and adjusting, by a cooling device, a cooling capacity according to the cooling control signal.

11. The operation method of the illumination device according to claim 10, wherein the step of obtaining, by the controller, the reference temperature value of the phosphor wheel according to the light source control signal and the rotation speed status signal and comparing the temperature value of the phosphor wheel with the reference temperature value to generate the cooling control signal comprises:

recording, by a lookup table, a relationship among the rotation speed of the phosphor wheel, a current value of the light source current and the reference temperature value; and generating, by the controller, the cooling control signal through the lookup table according to the rotation speed status signal and the light source current.

12. The operation method of the illumination device according to claim 10, wherein the step of obtaining, by the controller, the reference temperature value of the phosphor wheel according to the light source control signal and the rotation speed status signal and comparing the temperature value of the phosphor wheel with the reference temperature value to generate the cooling control signal comprises:

determining, by the controller, whether a temperature difference between the temperature value of the phosphor wheel and the reference temperature value is within a preset temperature range to generate the cooling control signal.

13. The operation method of the illumination device according to claim 12, wherein the preset temperature range is ±5% of the reference temperature value.

14. The operation method of the illumination device according to claim 12, wherein the step of determining, by the controller, whether the temperature difference between the temperature value of the phosphor wheel and the reference temperature value is within the preset temperature range to generate the cooling control signal comprises:

increasing, by the cooling device, the cooling capacity according to the cooling control signal if the temperature difference exceeds the preset temperature range and the temperature value of the phosphor wheel is greater than the reference temperature value; and reducing, by the cooling device, the cooling capacity according to the cooling control signal f the temperature difference exceeds the preset temperature range and the temperature value of the phosphor wheel is not greater than the reference temperature value.

15. The operation method of the illumination device according to claim 10, wherein the step of generating the rotation speed status signal comprises:

sensing, by a rotation speed sensor, the rotation speed of the phosphor wheel to generate the rotation speed status signal.

16. The operation method of the illumination device according to claim 10, wherein the rotation speed of the phosphor wheel and the light source current of the light source device are associated with the operation mode signal.

17. An operation method of a projection system, comprising:

generating, by a controller, a phosphor wheel control signal and a light source control signal according to an operation mode signal;

generating, by a light source device, an illumination beam according to the light source control signal;

converting, by a phosphor wheel, the illumination beam into a conversion beam, adjusting, by the phosphor wheel, a rotation speed of the phosphor wheel according to the phosphor wheel control signal, and generating a rotation speed status signal;

sensing, by a temperature sensor, a temperature value of the phosphor wheel to generate a temperature status signal;

generating, by the controller, a cooling control signal according to the temperature status signal, the rotation speed status signal, and the light source control signal;

obtaining, by the controller, a reference temperature value of the phosphor wheel according to the light source control signal and the rotation speed status signal, and comparing the temperature value of the phosphor wheel with the reference temperature value to generate the cooling control signal, wherein the light source control signal is associated with a light source current driving the light source device, the temperature status signal is associated with the temperature value of the phosphor wheel, and the rotation speed status signal is associated with the rotation speed of the phosphor wheel;

adjusting, by a cooling device, a cooling capacity according to the cooling control signal;

converting, by a light valve, the illumination beam into an image beam; and projecting, by a projection lens, the image beam.

* * * * *